United States Patent Office 2,986,474
Patented May 30, 1961

2,986,474
SHIP'S HULL COATED WITH ANTI-FOULING SILICONE RESIN AND METHOD OF COATING

Edward Robbart, 321 Fairmont Ave., Milton 86, Mass.

No Drawing. Filed Apr. 12, 1955, Ser. No. 500,981

4 Claims. (Cl. 117—94)

The present invention relates to surface coatings having anti-fouling properties and useful for preventing the accumulation of barnacles on objects exposed to marine conditions.

Barnacle deposits are a notorious nuisance, particularly on a ship's hull where they greatly add to the weight and skin resistance of the hull and thus result in higher fuel costs, slower speeds and increased engine wear unless they are frequently removed or their growth and accumulation are prevented. Numerous surface coating compositions, generally designated as anti-fouling paints, have been developed in an effort to prevent barnacle deposits. Most of them employ poisonous chemicals repellent or deadly to the barnacles, but which slowly dissolve and leach out eventually leaving the surface coating ineffective.

The present invention provides a novel surface coating which does not employ repellent chemicals, but which eliminates barnacles by providing a surface to which, apparently, the barnacles are unable to cling. Barnacle accumulations arise when the barnacle larvae, originally free swimming, attach themselves to the marine object by an adhesive secretion, and then form about themselves a hard rough protective shell.

This invention is based on the discovery that barnacle accumulation may be largely avoided if the surface is provided with a surface coating of certain silicone resins. Thus, this invention contemplates in general the provision of a silicone resin surface coating for any of numerous objects exposed to marine conditions particularly ship hulls where the cost savings may be enormous.

Silicone resins are well-known and consist of crosslinked siloxane polymers of the general chain structure

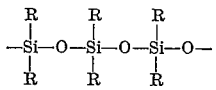

where R represents hydrogen atoms, alkyl groups, aryl groups, or other cross-linked siloxane chains.

Particularly suitable as silicone resins for the purposes of this invention are the methyl polysiloxanes, the methyl phenyl polysiloxanes, the ethyl polysiloxanes and the ethyl phenyl polysiloxanes, although other well-known siloxane polymers are satisfactory. Preferred silicone resins are the methyl phenyl polysiloxanes in which both phenyl and methyl groups are attached to the silicone atoms of the siloxane chains, each in substantial proportions, e.g. each in a ratio of between about 1:2 and 2:1.

The silicone resin should be cross-linked sufficiently to provide a hard and insoluble surface coating, and the degree of cross-linking will vary depending on the nature and composition of the resin. In general, the degree of cross-linking, expressed as the ratio of organic radicals to silicon atoms (R/Si ratio), for the preferred methyl phenyl silicone resins should be 1.8 or lower.

In applying the silicone resin surface coating to the object to be coated, the silicol compound which may be condensed to the desired silicone resin is dissolved in a volatile solvent and applied to the surface, and permitted to dry. The coating is then baked to cause condensation polymerization of the silicol to the silicone. If desired, pigments, fillers or coloring agents may be added to the coating by dispersing them in the silicol solution prior to its application to the surface.

Suitable silicone resin-forming compounds (silicol solutions) are available commercially under the trade names "Dri-Bake" sold by General Electric Company, and "Pan Glaze" sold by the Dow-Corning Corporation; but other commercially available silicone resin compositions may also be used.

Silicone resin-forming compounds suitable for use in this invention may also be prepared by well-known methods such as the hydrolysis of an organo-halogeno-silane to form the silicol, according to the typical reaction $$R_2\text{—Si—}Cl_2 + 2H_2O \rightarrow R_2\text{—Si(OH)}_2 + 2HCl$$

The silicol may partially condense by the splitting of water from the hydroxyl groups or may be formed as the monomeric silanediol. In either case the hydrolysis product is referred to herein as silicol.

The desired organic groups are incorporated in the silicone resin by selecting the silanes having these groups, and cross-linking is conveniently provided for by including some silicols having three or more hydroxy groups, as by hydrolyzing in admixture with the organo di-halogeno silane, some tri-halogeno silane or silicone tetrahalide.

Methyl phenyl silicol from which the preferred methyl phenyl silicone resins may be prepared, may be formed from methyl phenyl silanediol or by co-condensing a methyl silicol and a phenyl silicol in proportions giving the desired ratio of methyl and phenyl groups, together with some cross-linking compound.

Although cross-linking is generally provided by including some tri or tetra functional silicol, other means of cross-linking are also useful, for instance the incorporation of a vinyl silicol which may cross-link through polymerization of vinyl groups.

The general nature and chemistry of silicone resins are well-known in the art and the details of preparing them are not considered part of this invention nor essential to an understanding of it.

The following example of a typical embodiment of this invention is presented by way of illustration.

A steel surface was treated by spraying on it several coatings of the methyl phenyl silicol composition sold as "Dri-Bake," and baking each coating for 10 minutes at 250° F. after the solvent had evaporated. A coating about ⅛" thick was formed in this way. The surface was then immersed in the ocean together with an untreated plate. After six weeks the treated surface showed only a slight amount of barnacle growth which immediately fell off when the plate was tapped. The untreated plate was heavily encrusted with barnacles.

Although pigments, fillers, coloring agents and the like may be incorporated in the surface coating composition, if desired, they are in no way essential to this invention. Also, since it appears that the success of a silicone resin surface coating as a preventative for the accumulation of marine deposits depends at least in part on there being a smooth vitrous surface, it will be understood that fillers or pigments that destroy the normal smoothness of the surface are to be avoided.

Having thus disclosed my invention and described in detail a preferred embodiment thereof, I claim and desire to secure by Letters Patent:

1. In combination with a ship's hull having an outer surface normally immersed in sea water, an anti-fouling coating on said surface comprising an insoluble silicone resin having a smooth outer surface.

2. In combination with a ship's hull having an outer surface normally immersed in sea water, an anti-fouling coating on said surface having a smooth outer surface comprising a silicone resin having siloxane chains of the structure

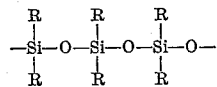

where each R is selected from the group consisting of methyl, ethyl and phenyl, said chains being cross-linked to an extent such that the R/Si ratio is less than 1.8.

3. The combination defined by claim 2 wherein the silicone resin is a methyl phenyl siloxane.

4. The method of preventing the fouling of a surface of a ship's hull normally immersed in sea water comprising applying to said surface a coating of an insoluble silicone resin having a smooth outer surface, and immersing said surface in sea water.

References Cited in the file of this patent

UNITED STATES PATENTS

| | | |
|---|---|---|
| 2,495,306 | Zurcher | Jan. 24, 1950 |
| 2,529,206 | Winslow | Nov. 7, 1950 |
| 2,567,804 | Davies | Sept. 11, 1951 |
| 2,660,736 | Biefeld | Dec. 1, 1953 |